Sept. 5, 1967  R. E. CAPPEL  3,339,795
STORAGE APPARATUS

Filed March 24, 1965  4 Sheets-Sheet 1

INVENTOR
RALPH E. CAPPEL
by Albert L. Jeffers
ATTORNEY

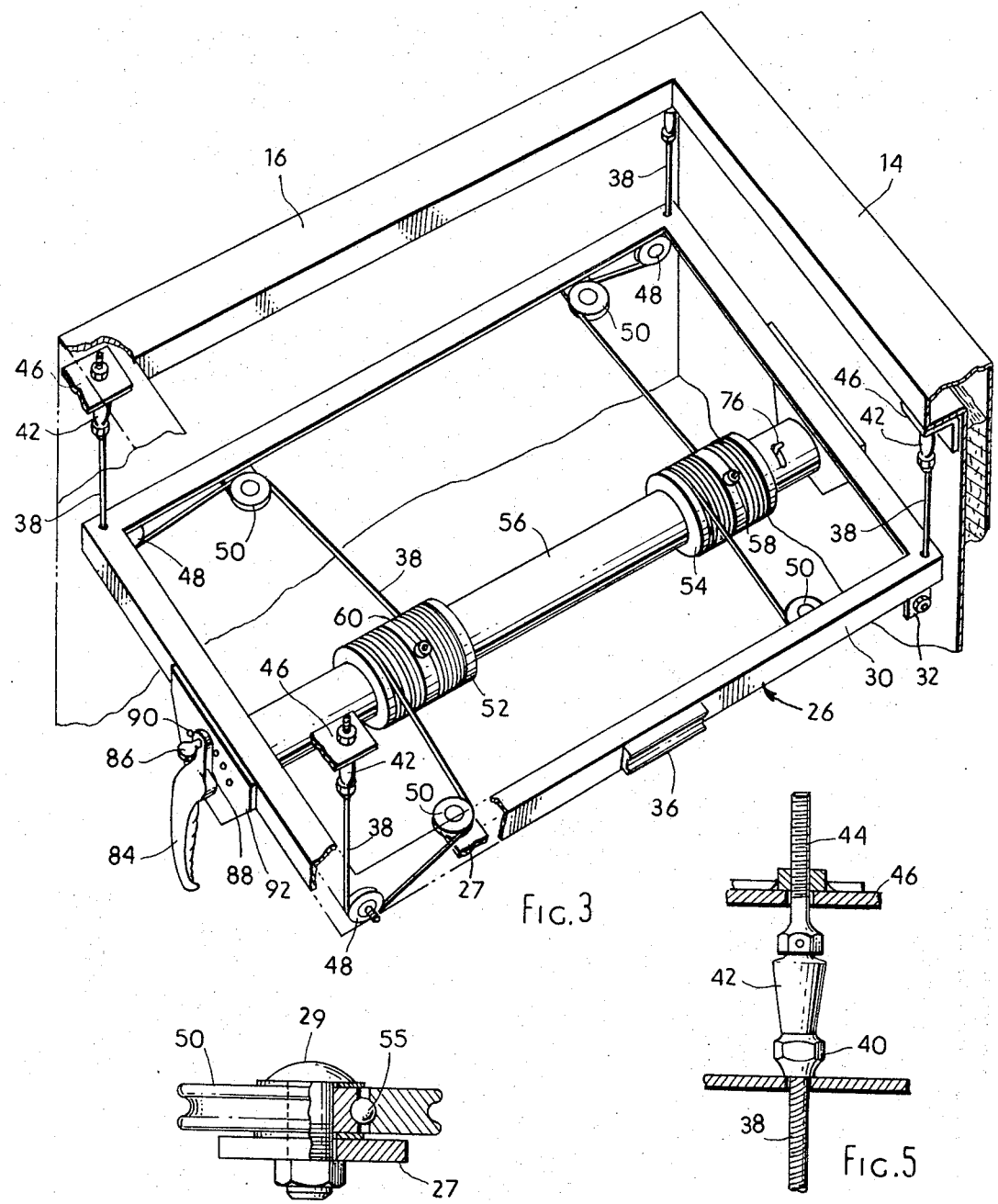

Sept. 5, 1967     R. E. CAPPEL     3,339,795
STORAGE APPARATUS

Filed March 24, 1965     4 Sheets-Sheet 3

INVENTOR
RALPH E. CAPPEL
by Albert L. Jeffers
ATTORNEY

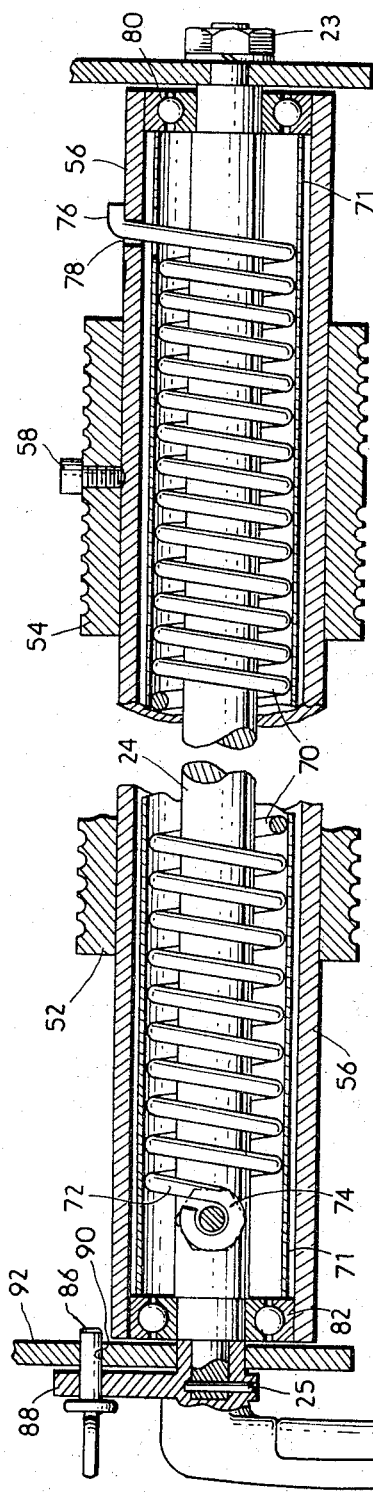
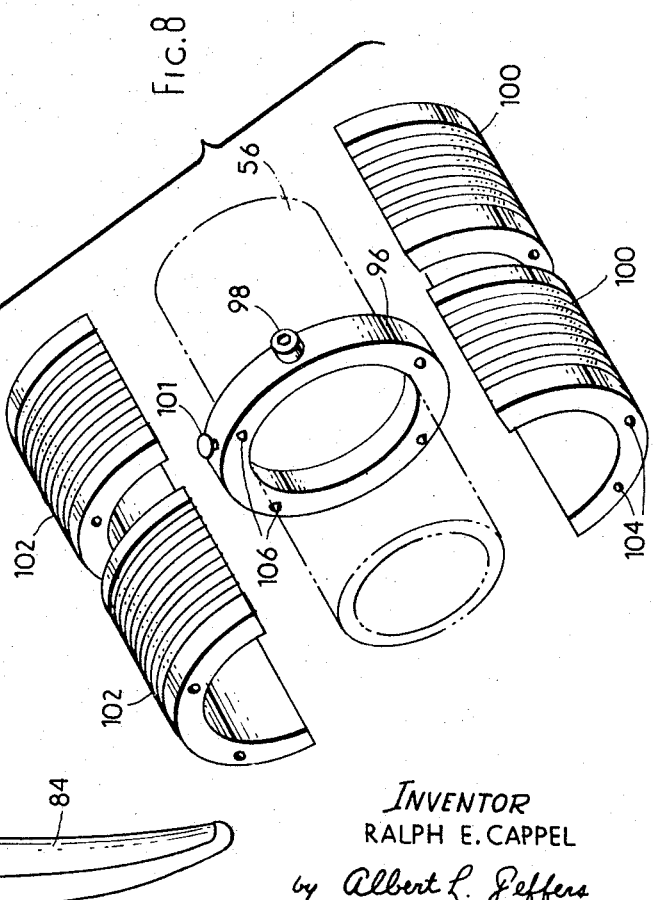

United States Patent Office 3,339,795
Patented Sept. 5, 1967

3,339,795
STORAGE APPARATUS
Ralph E. Cappel, Fort Wayne, Ind., assignor to Lincoln Manufacturing Co., Inc., Fort Wayne, Ind., a corporation of Indiana
Filed Mar. 24, 1965, Ser. No. 442,367
3 Claims. (Cl. 220—93)

This invention relates to an improved storage, and more particularly to an improved storage for containing food stuffs and other materials such as glassware, trays, containers, or cups, which it is intended to store under conditions which are heated or cooled in relation to the surrounding temperature or thereby to maintain such materials at room temperature. The invention is particularly adapted for storing beverages and hot-or-cold plate materials in institutional feeding applications, in cafeterias, in restaurants, and other applications where it is desired to provide access to the food or other objects which are stored within the cabinet.

It is a common practice, in dispensing food stuff to provide a storage cabinet having a storage compartment with the food stuff stacked vertically in the compartment. Since, however, it is necessary to reach an access opening at the top of the compartment to withdraw the food, it is desirable to have the level of the food always at a conveniently raised position so that it can be withdrawn. That is, when a quantity of cartons of milk are removed from within racks, it is provided that the carriage will successively raise so that the uppermost rack is always at the upper part of the compartment and this prevents unnecessary reaching down into the compartment to withdraw cartons of milk or other products as the storage compartment is depleted. This successive raising of the materials which are being dispensed is necessary because the capacity of the storage cabinet is determined by the depth of the compartment. In cases where the depth is considerable, it can become very inconvenient to reach down into the compartment for the food. Therefore, particularly in cases of cafeteria applications where the customers file past the compartment and remove the beverage or other article, it can become important to the saleability of the product that the product remains at all times within easy reach and accessible level otherwise the compartment will give the illusion of being emptied or else the inaccessibility itself becomes a discouragement to the purchase of the articles.

It is therefore one of the objects of the present invention to provide a storage cabinet which includes an automatic elevator means which will automatically raise in response to withdrawal of the food stuff contained in the elevator means, to maintain the top stack of food or beverage at the same level for convenient withdrawal from the access opening.

It is a further object of the present invention to provide an automatic elevator means which will maintain the stack of food articles in such a position that the uppermost part of the stack is always maintained at the same vertical level and such stack is maintained substantially level or "square" with respect to the compartment even though it may be unevenly loaded.

It is a further object of the invention, to provide a specific improvement of elevator means shown in Patent No. 3,269,589 granted Aug. 30, 1966, and which is assigned to the same assignee as the present application, it being a specific improvement of the present invention to provide a spring motor which will automatically raise the elevator means as the supportive load lightens and such elevator means will be maintained level even though the supportive load may be unevenly distributed while it is being unloaded.

It is a still further object of the present invention to provide a new and improved adjustment means which can provide for different kinds of loads, that is different kinds of beverages and containers representing different load distribution and pier loads whereby the level of the piers is successively raised by the elevator means so that the uppermost pier remains at substantially the same vertical level for removal. In this way, the same elevator means is adapted for dispensing various food stuffs and various beverages, having containers of cardboard, glass, plastic, china, or other composition.

It is an overall object of the present invention to provide a spring loaded elevator means which is weight-responsive and which is adapted to lower under the weight of the articles stored and to raise upwardly as the weight diminishes or the material is withdrawn, thereby always presenting the material at a convenient level and that such elevator means will at all times remain "squarely" within the insulated storage compartment even though the food stuff may be unevenly loaded and unevenly unloaded from one side to the other.

Other objects and features of the present invention will become apparent from a consideration of the following description which proceeds with reference to the accompanying drawings, wherein:

FIGURE 3 is a perspective view showing in greater detail the elevator means, adjuster and anchor with the compartment walls broken away;

FIGURE 4 is an enlarged detail view of the bearing for one of the pulleys associated with the carriage means of FIGURE 3;

FIGURE 5 is an enlarged detail view of the anchor which is used for securing the end of the cable part of the elevator means in FIGURE 3;

FIGURE 7 is an enlarged detail view of the spring motor which is used for raising and lowering the elevator means; and, FIGURE 8 is an exploded perspective view of a further embodiment of the invention illustrating a wind-up drum which is used for storing and dispensing the cable, which are part of the elevation mechanism.

Figure 1:
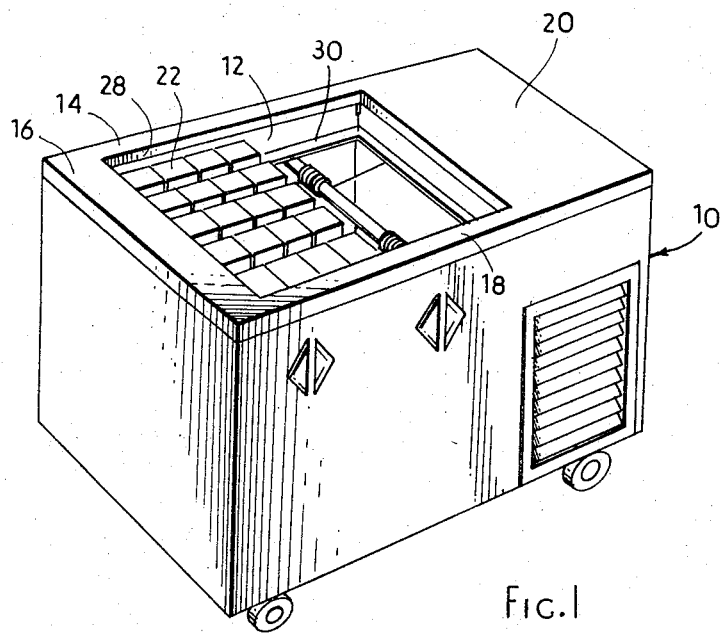
FIGURE 1 is a perspective view of the storage cabinet.

Referring now to the drawings, the storage cabinet designated generally by reference numeral 10 includes a compressor, motor and other associated structure for either refrigerating or heating the compartment 12 which has surrounding insulated walls 14-20 for maintaining temperature difference over the surrounding temperature. Within the compartment 12 are a number of racks containing food stuffs as for example cartons of milk 22, it being understood of course that any beverage or food stuff can be stored within the compartment 12 which is desired.

One of the important features of the present invention is that loading and unloading can occur without necessity for horizontal dividers. That is, the space around the four corners of the compartment need not be subdivided for distribution of loading. Instead, the loading can occur in vertical layers without regard for horizontal distribution of the product.

Figure 2:
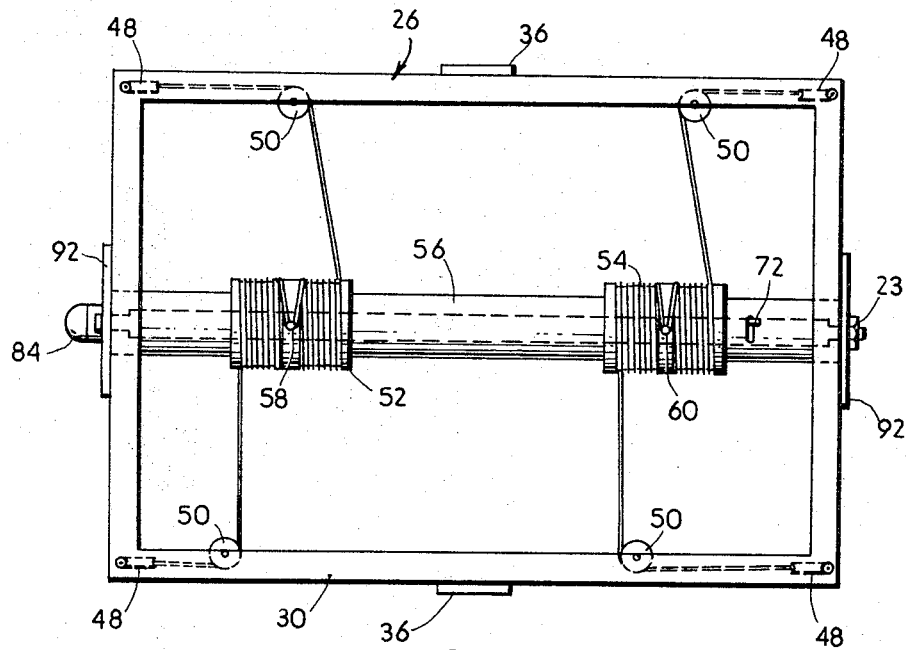
FIGURE 2 is a plan view of the elevator means which is used for supporting the food stuff within the compartment and for raising and lowering such food stuffs according to the quantity of the food stuff within the compartment.
Figure 6:
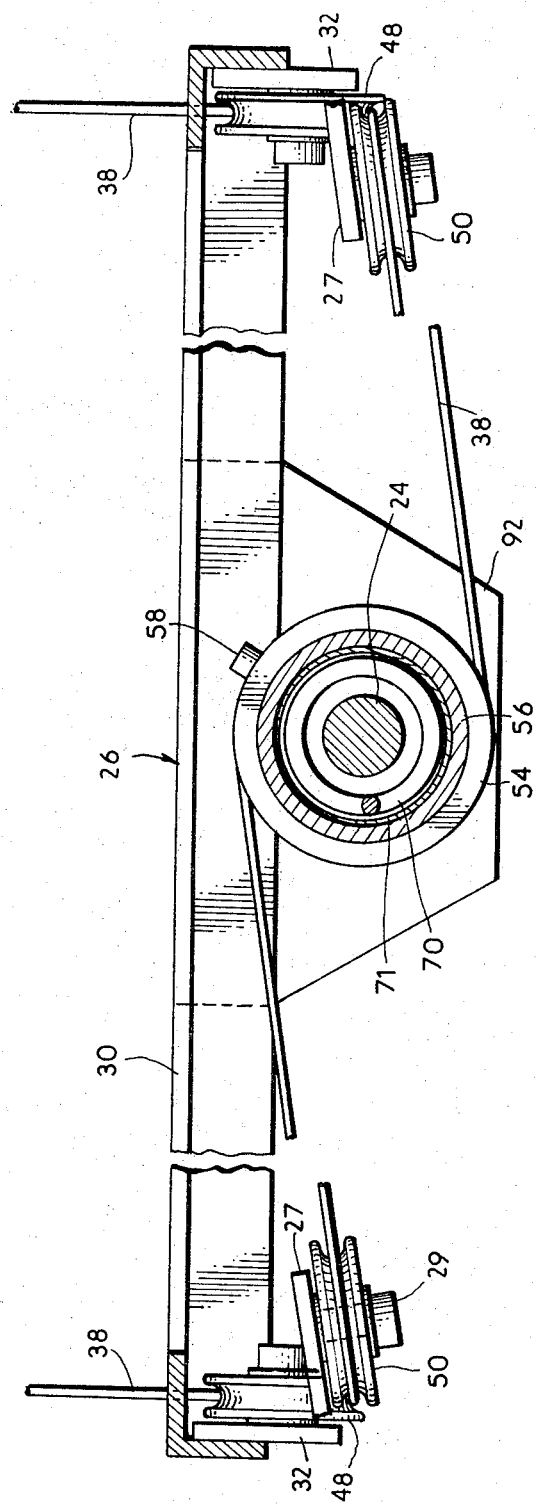
FIGURE 6 is an enlarged detail view of the pulley and wind-up mechanism for the supporting cable, which are part of the elevator structure.

In order to obtain full utility from the storage compartment 12 it must be possible to store food stuffs throughout the compartment and to keep from having to bend over to reach the last rack of the bottom stack of racks there is provided an automatic elevator means designated generally by reference numeral 26 (FIGS. 2, 3), the general purpose of which is to automatically raise the level of the food as the load is lightened in order that the uppermost rack is maintained substantially at the level of the access opening 28, thus eliminating any requirement for reaching down into the compartment to withdraw food. The elevator means comprises a carriage in the form of a rectangular frame 30 which is proportioned to fit within the compartment 12, approximating its general outline and proportioned to move vertically therein without interference with the side walls of the compartment. The carriage 30 is free floating, that is it can move slightly back and forth and from side to side without scraping the side walls. There are provided, however, protective nylon composition bumpers 36 to prevent damage to the side walls should any scraping occur. The frame 30 is suspended at each of its corners by flexible cables 38 which are passed through crested nuts 40 and sleeves 42 and then secured by bolts 44 to a flange 46 (FIG. 5) of the cabinet and is permanently anchored thereby to the cabinet. The cables are passed over change-direction pulleys 48 and 50 (FIGS. 3 and 4) which are mounted on anti-friction roller bearings on the frame 30 and are then wound onto drums 52 and 54.

Referring to FIGURE 3, two of the cables are wound onto one set of drums and the other two cables at the opposite corners are wound onto a second set of drums, the two sets of drums being spaced along the length of a rotatable shaft 56 and are tied to the shaft by a set screw or the like 58, 60. As the carriage or elevator means is lowered the cables 38 are unwound from the drum set and as the elevator means is raised the cables are wound onto the drums, said drums having helically formed grooves which form tracks for the cable so as the cable is wound onto the drum it will follow a prescribed path. Owing to the location of the cables, and the points of connection between the cable and the carriage 30, the carriage is held at all times "squarely" within the compartment 12 and it will not tip or vary from a horizontal planar position even though the supported load may be distributed unevenly from one side to the other of the elevator. For example, if all the milk cartons at one side of the elevator are removed the elevator means will not respond by tipping; instead all of the load will be evenly distributed by the four support cables at the four corners of the frame 30, thus maintaining elevator means squarely within the compartment. Within the rotatable shaft 56 is a helical motor spring 70 surrounded by a tube 71 (FIG. 7) which is coiled with its one end 72 held by a nut 74 and its opposite end 76 is passed through an opening 78 of the rotatable shaft 56 which is supported on bearings 80, 82, in order to rotate the shaft 56 thereby to rotate the drum shaft and raise the elevator. The purpose of the tube 71 is to prevent distortions or buckling of the spring 70 which is limited in its movement to coiling and uncoiling as the elevator raises and lowers. The tension on the coil spring motor is regulated by a handle 84 which can wind up or tension the spring by moving the handle 84 into the plane of the paper (FIG. 7) and then locking the spring in that position by means of a set pin 86 which passes through aligned openings in a plate 88 carried by the handle 84, and an opening, one of a series of openings 90, arranged in an arcuate path of a gusset plate 92 supported on the carriage 30. Therefore, the tension on the coil spring motor 70 can be varied to suit the specific kind of load which is anticipated in the cabinet 10.

A further adjustment possible, is to vary the diameter of the drum which serves as a wind-up for the cable. Referring to FIGURE 8, the collar 96 is locked to shaft 56 by means of the circumferentially spaced set screws 98 and two drum halves 100 and 102 are fitted around the shaft 56, the two halves being one on each side of the collar 96 and the spaced openings 104 are interlocked with complementary projections 106 on the collar 96 to form a driving connection between the collar 96 and the drum halves 100, 102. All that is required then is one or more turns of the cable around the circumference of the two halves 100, 102 to hold the two halves together around the shaft 56 and the end of the cable is then locked with a set screw 101. The helical motor spring 70 then rotates the shaft 56 the same as in the previous embodiment, also rotating the drum which is made up in two sections 100 and 102, and the rotation causes the cable to follow the grooved helical tracks winding up the cable onto the drum thereby raising the elevator and carriage 30. Conversely, to lower the spring elevator 30 the cable is fed off of the drum, counter-rotating the drum and axle 56 against the resistance of the clock spring 70 causing the clock spring to become more tightly coiled and storing the energy in the clock spring.

In operation, the compartment 12 is loaded with a plurality of racks of beverage or other food and the increasing weight is supported on the carriage 30 and borne by the clock spring 70, causes the elevator to sink lower within the compartment thus reaching a final equilibrium position in which the uppermost rack is supported at about the upper level of the access opening 28. There is a sufficient quantity of cable length 38 to permit the elevator to travel its full downward movement within the compartment 12 allowing the elevator to bottom within the compartment 12. At this point the coil spring 70 is wound to its tightest condition and there is the least amount of cable coiled on the drums 52, 54. As the compartment is unloaded by customers removing containers of milk the load lightens and thus permits the spring motor 70 to uncoil, winding the cable length 38 onto the spaced drums 52, 54 and successively raising the elevator 30 so that the equilibrium position is always such that the uppermost stack of material is disposed at about the level of the access opening 12.

It is one of the important features of the present invention that although the trays or cartons may be unevenly loaded from one side to the other of the support carriage 30 the support carriage will nonetheless remain "square" within the compartment. That is, the support tension on each of the cable lengths 38 will remain substantially the same even though the support load may be uneven from one side to the other of the frame 30. There is consequently no binding or resistance to raising movement of the spring elevator which will maintain the same equilibrium for it on a support load, maintaining light loads at a higher level and conversely, sinking lower so that heavier loads and higher stacks of material are loaded sufficiently into the compartment so that the uppermost portion of the stack of food remains at all times at substantially the same point, i.e., level with the top of the access opening 28. The elevator is free to float within the opening so that it will at all times be free to raise and lower, and without binding against the contiguous insulated walls of the compartment. In the event, however, that contact is made with the walls the nylon bumper 36 will prevent damage between the parts by scraping movement.

In order to adjust for different kinds of foods and weight of food in containers, the handle 84 can be adjusted to vary the spring load by pulling out the pin 86 and turning the handle 84 in one direction or the other to vary the tension on the motor spring, and once the adjustment is made the handle position 84 is fixed by repositioning the pin 86 through aligned openings 88 in one of the arcuately disposed openings 90 in a plate 92 secured to the frame 30 (FIGS. 3, 7). Further adjustments are provided by changing the diameter of the wind-up drum with a selected pair of drum halves 100, 102 which are secured around the shaft 56 by one or more turns of the cable, the free end of the cable then being secured to a pin 101 on collar 96 and co-rotation of the drum being insured by interlocking openings 104 with spaced pawls 106 along the side edges of the ring 96.

Although the present invention has been illustrated and described in connection with a single example embodiment it will be understood that this is illustrative of the invention and is by no means restrictive thereof. It is reasonably to be expected that those skilled in this art can make numerous revisions and adaptations and it is intended that such revisions and adaptations will be included within the scope of the following claims as equivalents of the invention.

What is claimed is:

1. In a storage cabinet having a compartment with an access opening, the improvement comprising a weight-responsive elevator adapted to be positioned at a variable vertical level dependent upon the weight of load on said elevator, whereby the upper portion of said load is maintained at a substantially constant location relative to said access opening of said compartment, said elevator comprising a load receiving frame; an elongated, substantially cylindrical element rotatably mounted on said frame; a helical spring positioned within said cylindrical element and extending along substantially the full length of said cylindrical element, said spring having one end fastened to said frame and having the other end fastened to said cylindrical element; first and second flexible cables attached inwardly from the end to said cylindrical element at substantially the same first location, said first and second cables being wound from their locations of attachment in the same direction around said cylindrical element and extending substantially transversely from said cylindrical element in respective first and second directions that are substantially opposite each other; third and fourth flexible cables attached inwardly from the end to said cylindrical element at substantially the same second location spaced from said first location, said third and fourth cables being wound from their locations of attachment in the same direction around said cylindrical element and extending substantially transversely from said cylindrical element in said respective first and second directions; direction changing pulleys mounted on said frame at each of four substantially rectangularly positioned corners for changing the direction of each of said four cables to a substantially vertically upward direction; one of said pulleys being spaced inwardly from the end of said frame and the other of said pulleys being spaced substantially at each corner of said frame, each of said four cables passing over said direction changing pulleys and extending substantially vertically upward from said frame; and means respectively fastening the other end of each of said four cables to said cabinet at each of four substantially rectangularly positioned corners whereby vertically downward movement of said elevator effects rotation of said cylindrical element in a direction which coils said spring more tightly and stores energy therein to effect raising said elevator and its supported load as said load is lightened.

2. In a storage cabinet having a compartment with a substantially rectangular access opening therein, the improvement comprising a load carrying elevator adapted to maintain the upper portion of said load at a substantially constant vertical location relative to said access opening of said compartment, said elevator comprising a load receiving frame; an elongated, hollow element rotatably mounted on said frame; a helical spring positioned within said elongated element, said spring having one end fastened to said frame and having the other end fastened to said elongated element; first and second cable drums positioned around and fastened to said elongated element and spaced inwardly from the ends of said elongated element; first and second flexible cables attached at one end to said first drum, said first and second cables being wound from their points of attachment in the same direction around said first drum and extending substantially horizontally from said first drum in respective first and second directions that are opposite each other; third and fourth flexible cables attached at one end to said second drum, said third and fourth cables being wound from their points of attachment in the same direction around said second drum and extending substantially horizontally from said second drum in respective third and fourth directions that are opposite each other; direction changing pulleys mounted on said frame at each of four substantially rectangularly positioned points for changing the horizontal direction of each of said four cables to a vertically upward direction; one of said pulleys being spaced inwardly from the end of said frame and the other of said pulleys being spaced substantially at each corner of said frame, each of said four cables passing over respective direction changing pulleys and extending substantially vertically upward from said frame; and means respectively fastening the other end of each of said four cables to said cabinet in the vicinity of said access opening at each of four substantially rectangularly positioned points whereby vertically downward movement of said elevator effects rotation of said drums and said elongated element in a direction which causes said spring to be coiled more tightly and store energy, and whereby said stored energy causes said elevator and its supported load to be raised as said load is lightened.

3. The elevator of claim 2, and further comprising means to which said one end of said helical spring is fastened for varying its rotational position relative to said frame, said varying means comprising an elongated member positioned within said helical spring with means for varying its rotational position relative to said frame.

References Cited

UNITED STATES PATENTS

| | | | |
|---|---|---|---|
| 1,064,503 | 6/1913 | Lewis et al. | 312—306 |
| 1,555,988 | 10/1925 | Kiss | 312—306 |
| 1,739,431 | 12/1929 | Willauer | 220—93 |
| 2,148,983 | 2/1939 | Grubb. | |
| 2,243,940 | 6/1941 | Ball | 220—93 |
| 2,549,664 | 4/1951 | Collins | 312—312 |
| 2,649,992 | 8/1953 | Bockius | 220—93 |
| 2,717,085 | 9/1955 | Waddington | 220—93 |

THERON E. CONDON, *Primary Examiner.*

RAPHAEL H. SCHWARTZ, *Examiner.*